United States Patent [19]

Chen et al.

[11] 4,178,432
[45] Dec. 11, 1979

[54] COPOLYOXALAMIDE FROM BRANCHED CHAIN DIAMINE

[75] Inventors: Augustin T. Chen, Cheshire; Kemal B. Onder, North Haven, both of Conn.

[73] Assignee: The Upjohn Company, Kalamazoo, Mich.

[21] Appl. No.: 928,206

[22] Filed: Jul. 19, 1978

Related U.S. Application Data

[63] Continuation of Ser. No. 824,645, Aug. 15, 1977, abandoned.

[51] Int. Cl.$^2$ .............................................. C08G 69/26
[52] U.S. Cl. .................................... 528/340; 528/173; 528/229; 528/337; 528/343; 528/349; 528/347; 260/30.2; 260/30.6 R; 260/30.8 R; 260/31.2 N; 260/33.4 R
[58] Field of Search ................ 528/340, 343, 349, 173, 528/229, 337

[56] References Cited

U.S. PATENT DOCUMENTS

| | | | |
|---|---|---|---|
| 2,945,011 | 7/1960 | Caldwell et al. | 528/343 |
| 3,442,869 | 5/1969 | Wolfes et al. | 528/349 |
| 3,516,972 | 6/1970 | Wolfes et al. | 528/349 |
| 3,553,289 | 1/1971 | Duxbury et al. | 528/343 |

Primary Examiner—Harold D. Anderson
Attorney, Agent, or Firm—James S. Rose; Denis A. Firth

[57] ABSTRACT

Novel copolyoxalamides having the recurring unit

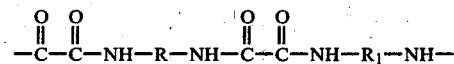

are disclosed wherein R is a divalent aromatic radical and $R_1$ is a divalent radical selected from the group consisting of 2,2,4- and 2,4,4-trimethylhexylene,

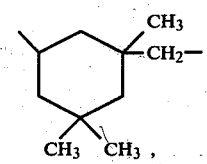

and mixtures thereof.

The novel copolyoxalamides are injection-moldable, thermoplastic materials which are characterized by good high temperature resistance and excellent resistance to oxidative degradation.

7 Claims, No Drawings

COPOLYOXALAMIDE FROM BRANCHED CHAIN DIAMINE

This is a continuation of application Ser. No. 824,645 filed Aug. 15, 1977, now abandoned.

BACKGROUND OF THE INVENTION

1. Field of the Invention

This invention relates to the preparation of copolyamides and is particularly concerned with copolyoxalamides.

2. Description of the Prior Art

Polyamide polymers are well known to those skilled in the art, see for example The Encyclopedia of Polymer Science and Technology, Vol. 10, pp. 347–593, 1969, Interscience Publishers, New York, N.Y. The various kinds of repeating units disclosed therein which are linked by the carbonamide group

determine the variation in physical properties observed for the different types of polyamides. Physical properties like melting point and solubility are dependent on the type of repeating unit employed.

Polyoxalamides wherein the carbonyl groups are derived from the oxalyl radical are particularly dependent on the type of radical derived from the diamine monomer unit for the properties they display. For example poly(hexamethyleneoxalamide) melts at 320° C. which is prohibitively high for this material to be practically useful as an injection moldable material. On the other hand, poly(decamethyleneoxalamide), which differs from the former material by only four carbon atoms in the chain separating the two amide nitrogens, melts at the very much lower value of 240° C. and has a low $T_g$ because of its aliphatic backbone.

Various kinds of polyoxalamides are known in the art. Generally speaking, they are high melting, difficult to process, crystalline materials. Illustratively, U.S. Pat. No. 2,977,340 discloses fiber forming polyoxalamides wherein a divalent aliphatic radical connects the oxalamide residues. U.S. Pat. No. 2,945,011 shows copolyoxalamides wherein the radicals separating the oxalamide residues alternate between an aromatic radical and an aliphatic radical containing from 4 to 15 carbon atoms which preferably contain at least one ether linkage. The copolyoxalamides can be used for the production of fibers, coatings, and molded objects.

U.S. Pat. No. 3,553,289 discloses polyoxalamides wherein the oxalamide residues are separated by the aliphatic radical derived from 3-aminomethyl-3,5,5-trimethylcyclohexylamine. The use of additional diamines in conjunction with the cyclohexyl compound is also disclosed. However, specific aromatic diamines are not disclosed and the only working example showing a mixture calls for a mixture of 9 percent hexamethylene diamine and 91 percent 3-aminomethyl-3,5,5-trimethycyclohexylamine. The polyoxalamides are then blended with other polyamides to be spun into synthetic fibers.

U.S. Pat. No. 3,932,365 discloses both poly(p-phenyleneoxalamide) fibers and poly(4,4'-methylenebisphenyleneoxalamide) fibers and British Pat. No. 1,451,680 discloses a series of polyoxalamide-amide polymers used primarily for fiber making.

The prior art does not disclose a polyoxalamide which could serve as a high temperature resistant engineering thermoplastic, that is to say, a polyoxalamide that is injection moldable yet is still possessed of good high temperature resistance.

We have found that the novel copolyoxalamides prepared in accordance with the present invention and described in detail hereinbelow are characterized by injection moldability and by remarkable resistance to a high temperature environment including excellent resistance to oxidative degradation.

SUMMARY OF THE INVENTION

This invention comprises copolyoxalamides having the recurring unit

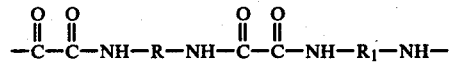

wherein R is a divalent radical selected from the group consisting of phenylene, tolylene, naphthylene, diphenylene, and divalent radicals having the formula

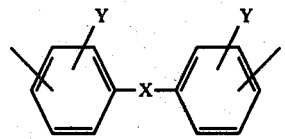

wherein Y is selected from the group consisting of hydrogen, alkyl having from 1 to 4 carbon atoms inclusive, alkoxy having from 1 to 4 carbon atoms inclusive, and halogen, and X is selected from the group cosisting of —CO—, —SO$_2$—, —O—, —S—,

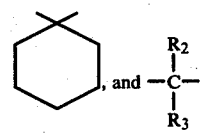

wherein R$_2$ and R$_3$ are independently selected from the class consisting of hydrogen and alkyl having from 1 to 4 carbon atoms inclusive, and mixtures thereof; and R$_1$ is a divalent radical selected from the group consisting of 2,2,4-trimethylhexylene, 2,4,4-trimethylhexylene,

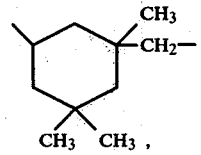

and mixtures thereof.

The term "alkyl" from 1 to 4 carbon atoms" means methyl, ethyl, propyl, butyl, and isomeric forms thereof.

The term "alkoxy from 1 to 4 carbon atoms" means methoxy, ethoxy, propoxy, butoxy, and isomeric forms thereof.

The term "halogen" means fluorine, chlorine, bromine, and iodine.

DETAILED DESCRIPTION OF THE INVENTION

In accordance with this invention there are provided linear copolyoxalamides having the recurring unit (I) wherein the divalent radicals R and $R_1$ are as defined above. A preferred divalent radical R has the formula

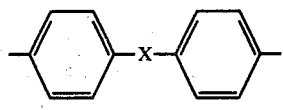

wherein X is defined as above.

Illustrative of the divalent radical R are m-phenylene, p-phenylene, 2,4-tolylene, 2,6-tolylene, and mixtures of 2,4-, and 2,6-tolylene, 1,5-naphthylene, 4,4'-biphenylene, 4,4'-oxydiphenylene, 4,4'-sulfonyldiphenylene, 4,4'-carbonyldiphenylene, 4,4'-isopropylidenediphenylene, 4,4'-methylenediphenylene, 3,3'-methylenediphenylene, 4,4'-methylenedi (3-methylphenylene, 4,4'-methylenedi (3-methoxyphenylene),4,4'-methylenedi(3-bromophenylene), and the like, and mixtures thereof. A preferred radical is 4,4'-methylenediphenylene.

It has already been noted hereinbefore that the copolyoxalamides in accordance with the present invention can have recurring units (I) wherein both R and $R_1$ can include mixtures of the divalent radicals in each defined category. Furthermore, it is still within the scope of the present invention that the radicals R and $R_1$ can be "diluted" with a minor amount (up to about 10 mole percent) of a divalent radical other than one falling within their respective definitions set forth above. For example, the radical R in a minor amount of the recurring units can be the same as $R_1$, or, conversely, the radical $R_1$ in a minor amount of the recurring units can be the same as R. Alternatively, the diluent radical for either R or $R_1$ can be alkylene having from 2 to 14 carbon atoms inclusive, cycloalkylene having from 6 to 14 carbon atoms inclusive, arylene having from 6 to 14 carbon atoms inclusive, and aralkylene having from 8 to 14 carbon atoms inclusive. If a diluent radical is present in (I), it is preferably alkylene having from 2 to 14 carbon atoms inclusive and preferably replaces a minor amount of the $R_1$ radical. A most preferred diluent radical is hexamethylene.

The copolyoxalamides in accordance with the present invention are characterized by ease of melt processing because of reduced polymer crystallinity. For example, molding, extrusion, and injection molding are possible with the absence of polymer degradation and without an increase in polymer shear modulus. These features are highly unexpected in view of the prior art polyoxalamides which are highly crystalline and are high melting polymers, as, for example, poly(hexamethyleneoxalamide) which melts at 320° C.

In spite of the ease of melt processing of the polyoxalamides of the present invention they are characterized by high glass transition temperatures which in turn gives rise to good high temperature stability.

Although the prior art discloses copolyoxalamides containing both aromatic and aliphatic radicals (see specifically U.S. Pat. No. 2,945,011) the polymers in question are characterized by high melting ranges and high crystallinity which precludes ease of injection moldability. Furthermore, it has been noted that a copolyoxalamide prepared in accordance with this prior art cannot be properly molded without polymer degradation occurring because of its crystallinity and high fusion temperature (see Example 4 below).

The copolyoxalamides of the invention are characterized by $\overline{M}_n$ molecular weights of from about 10,000 to about 50,000 as determined by gel permeation chromatography.

Furthermore, although the polymers of the invention have a high aromatic content they have good solubility in those solvents normally employed for polyamides. Illustrative of such solvents are the phenolic solvents such as m-cresol, cresylic acid, and the like; polar liquids such as linear or cyclic amides or phosphoramides, for example, N,N-dimethylformamide, N,N-dimethylacetamide, N-methylpyrrolidone, tetramethylenesulfone, and the like. This allows the copolyoxalamides of the present invention to be used in those applications calling for solutions such as in the preparation of films, coatings, lamination, and the like.

Unexpectedly, the copolyoxalamides of the invention are characterized by good stability against thermal oxidation. Even more unexpectedly, the polymers of the invention are characterized by excellent hydrolytic stability towards boiling water.

The copolyoxalamides having the recurring unit (I) are conveniently prepared using procedures well known to those skilled in the art for the manufacture of polyamides of oxalic acid, see for example, Preparative Methods of Polymer Chemistry by W. R. Sorenson and T. W. Campbell, pp. 73–75, 1961, Interscience Publishers, Inc., New York, N. Y.; or see U.S. Pat. No. 3,932,365.

Because of the ease of decarboxylation of oxalic acid and the very rapid hydrolysis of oxalyl chloride to oxalic acid, preparation methods starting with oxalyl esters are preferred. Accordingly, an oxalyl ester (II) is reacted with a 50/50 mole percent mixture of the diamines (III) and (IV) in accordance with the following equation

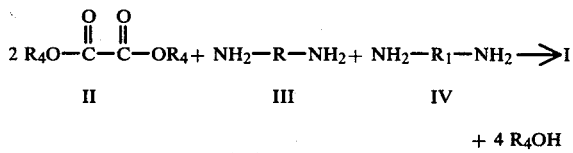

wherein R and $R_1$ are as defined above. Any diester of oxalic acid may be used athough it is preferred to employ a low boiling dialkyl ester wherein $R_4$ represents an alkyl group of from 1 to 8 carbon atoms, preferably 2 to 5 carbon atoms, and most preferably 4 carbon atoms.

In a particularly preferred process for the preparation of the polyoxalamides of the present invention either one of the diamines (III) or (IV) is reacted with an excess of the dialkyl oxalate ester to form the N,N'-bisalkylesteroxalamide (V) which is then reacted in the polymerization step with whichever one of the diamines (III) or (IV) that was not employed in the formation of (V). The following equation represents the polymerization step when the diamine (IV) is used.

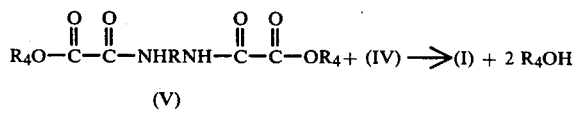

The polymerization reaction of (V) with the appropriate diamine (III) or (IV) ensures that the optimum regularity of the recurring unit (I) is obtained thereby maintaining the optimum properties of the polyoxalamides of the present invention.

The preparation of the N,N'-bisalkylesteroxalamide (V) is readily carried out using procedures well known in the art, see for example U.S. Pat. No. 2,945,011. An excess of the dialkyl oxalate (II) is simply heated with the diamine (III) or the diamine (IV), preferably under an inert atmosphere such as nitrogen, to effect the evolution of the 2 moles of the alcohol $R_4OH$ and the formula of (V). The diamines (III) or (IV) may be diluted with up to about 10 mole percent of a different diluent diamine so that the diesteroxalamide (V) may contain up to about 10 mole percent of a radical other than R or $R_1$ in accordance with the teaching set forth above. The diluent diamines will be discussed in detail below.

Illustrative of the dialkyl oxalates which can be used in the present invention are dimethyl oxalate, diethyl oxalate, dipropyl oxalate, dibutyl oxalate, dipentyl oxalate, dihexyl oxalate, and the like.

Illustrative of the diamines (III) employed in the present invention are m-phenylenediamine, p-phenylenediamine, 1,5-naphthalenediamine, 4,4'-diaminobiphenyl, 4,4'-methylenebis(phenylamine), 2,4-toluenediamine, 2,6-toluenediamine, 4,4'-diaminodiphenylsulfide, 4,4'-diaminodiphenylsulfone, 4,4'-diaminodiphenylether, 4,4'-diphenyl-1,1-cyclohexanediamine, 2,2-(4,4'-diaminodiphenyl)propane, 3,3+-dimethyl-4,4'-methylenebis (phenylamine), 3,3+-dimethoxy- 4,4'-methylenebis(phenylamine), 3,3+-dibromo-4,4'-methylene-bis(phenylamine), 4,4'-diaminobenzophenone, and the like. A preferred group is comprised of 4,4'-diphenyl-1,1-cyclohexanediamine, 2,2-(4,4'-diaminodiphenyl)propane, 4,4'-methylenebis (phenylamine), and 4,4'-diaminodiphenylether. A most preferred diamine is 4,4'-methylenebis(phenylamine).

The diamines (IV) include 3-aminomethyl-3,5,5-trimethylcyclohexylamine(isophorone diamine), 2,2,4-trimethylhexamethylene diamine, 2,4,4-trimethylhexamethylene diamine, and mixtures thereof.

The diluent diamines defined above are illustratively 1,2-bis(4-aminophenyl)ethane, 1,4-bis(2-aminoethyl)-benzene, 1,4-bis(aminomethyl)cyclohexane, bis(p-aminocyclohexyl)-methane, ethylenediamine, trimethylenediamine, tetramethylenediamine, pentamethylenediamine, hexamethylenediamine, heptamethylenediamine, octamethylenediamine, nonamethylenediamine, decamethylenediamine, undecamethylenediamine, dodecamethylenediamine, and mixtures thereof. A preferred group of diluent diamines is comprised of ethylenediamine, trimethylenediamine, tetramethylenediamine, pentamethylenediamine, and hexamethylenediamine.

The polymerization step can be carried out using methods well known to those skilled in the art, see Preparative Methods and U.S. Pat. No. 2,945,011 both cited supra for typical reaction conditions which can be employed in the present case.

Either a melt or solution type procedure can be employed. Generally speaking, a melt polymerization is preferred. The biesteroxalamide (V) and appropriate diamine (III) or (IV) are brought together and heated, preferably under a positive pressure of an inert gas such as nitrogen. The temperature is not critical provided it is at least high enough to cause boiling of the formed alcohol $R_4OH$. Advantageously, the polymer reaction mixture is heated from about 100° C. to about 350° C. and preferably from about 150° C. to about 200° C. Generally speaking, the temperature used will depend on whether a solvent is employed, the particular type of amine employed and the alcohol $R_4$ OH which is evolved.

Heating of the reaction mixture is continued until no more alcohol can be distilled off by which time either the viscosity of the solution has increased or a solid has precipitated from the reaction mixture. Generally speaking, this is the result of the formation of a low molecular weight prepolymer stage of the polyoxalamide.

At this stage, the prepolymer, if it has precipitated as a solid from a solvent, can be separated from the reaction mixture using standard means for isolating a solid from a liquid, for example, by suction filtration, or, alternatively and preferably, it is left in the reaction mixture and the temperature increased in order to distill off any solvent which may be optionally present.

Heating of the prepolymer, either in the form of the isolated solid or as a resinous mass after most of the solvent has been removed, is continued at a temperature above the previous range, advantageously from about 150° C. to about 350° C., and preferably from about 225° C. to about 300° C., and optionally under vacuum. The heating can be performed in one step at one elevated temperature, or, optionally, it can be carried out in a number of steps at successively higher temperature levels. The mode of carrying out this final polymerization heating stage is not critical and the choice of temperature or number of temperature increments is simply a matter of the choice of one skilled in the art and the means available for applying the heat. The time of heating is also not a critical factor and is easily determined by noting the solidification of the polymer mass or lack of any bubble formation due to solvent entrapment. Alternatively, a sample of the reaction mass can be analyzed by infrared spectroscopic methods for the presence or absence of ester carbonyl to determine the presence or absence of oxalyl ester (II) or (V) depending on which polymer reaction is employed. This final heating step is preferably performed in the absence of air or moisture being either under an inert atmosphere or else vacuum.

If a solvent is employed in the preparation of the polyoxalamides of the present invention the choice of solvent is not critical provided it does not itself react with the monomers or the polyoxalamide and provided it has a boiling point aove the boiling point of the alcohol $R_4OH$ being evolved during the polymerization.

Solvents which can be used include those listed hereinbefore for dissolving the polyoxalamides. Preferred reaction solvents are those organic solvents in which the polyoxalamines to be prepared are not soluble, such as inert aromatic hydrocarbons, halogenated aromatic hydrocarbons, and the like and exemplified in such solvents as toluene, xylene, isopropylbenzene, mesitylene, pseudocumene, butylbenzene, tetralin, 1,1-diphenylethane and the like; chlorobenzene, bromobenzene, o-dichlorobenzene, and the like.

If the copolyoxalamide is soluble in the solvent in which it is prepared then the polymer can be simply isolated by pouring the solution into a non-solvent for the polymer.

The copolyoxalamides prepared in accordance with the present invention can be used as molding powders, for the preparation of fibers and coatings from solution, for injection molding of articles, and the like. The solid polymers so obtained can be used in bushings, seal faces, electric insulators, compressor vanes and impellers, pistons and piston rings, gears, thread guides, cams, brake lining, clutch faces, abrasive articles. Further, coatings of the copolyamides of the present invention are useful in wire coating, in casting films, or spraying polymer films on a variety of substrates such as metal, ceramic, fabrics, polymerics, and the like.

Additives such as antioxidants, dyes, fire retardants, and the like may be added to solutions of the polymers of the present invention in solvents of the type set forth above prior to use of said solutions as coating compositions and the like. Alternatively the additives may be added to the dry powdered polymers either prior to, or during, processing steps such as molding, extruding, injection molding and the like.

The following examples describe the manner and process of making and using the invention and set forth the best mode contemplated by the inventors of carrying out the invention but are not to be construed as limiting.

EXAMPLE 1

A 250 ml. resin flask was equipped with a stirrer, a nitrogen inlet tube, a thermometer, and a short path distillation column. The flask was charged with 19.91 g. (0.05 mole) of 4,4'-methylenedioxanilic acid diethyl ester. [This diethyl ester had been prepared by distilling off ethanol over a six hour period from a mixture of approximately a 7 × molar excess of diethyl oxalate with 4,4'-methylenebisaniline at a temperature of about 150° C. under a nitrogen atmosphere followed by collection of the precipitated product and its recrystallization from ethanol to white needles; melting range, 146°–147° C.] There was also added to the flask, 8.51 g. (0.05 mole) of 3-aminomethyl-3,5,5-trimethylcyclohexylamine and 100 ml. of o-dichlorobenzene.

The reaction mixture was heated for 4 hours at 175° C. during which time ethanol was collected overhead of the short path distillation column along with a minor amount of o-dichlorobenzene. Heating was stopped, the mixture allowed to cool and then poured into excess ethanol causing the precipitation of a glue-like mass which solidified and was broken up in a Waring blendor, filtered and dried under vacuum at 120° C. for 4 hours. The white solid polymer was pulverized to pass 40 mesh.

The powdered solid was subjected to further polymerization by heating under 0.1 mm. of Hg, for 2 hours at 200° C. followed by 1 hour at 220° C. and finally 1 hour at 240° C. The copolyoxalamide had an $\eta$inh at 30° C. (0.5% in m-cresol)= 0.55 and was characterized by a recurring unit corresponding to the following structure

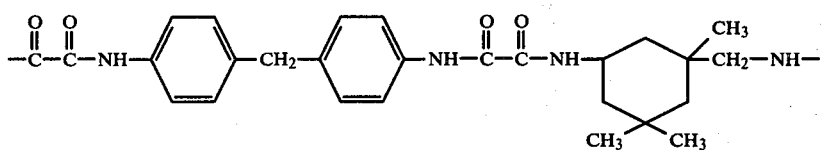

An 8 g. sample of the powdered copolyoxalamide was introduced into the barrel of a Monsanto Capillary Rheometer which was controlled to a barrel temperature of 280° C. with the die temperature being 290° C. The polymer was extruded under 150 psi through a 10:1 L/D ratio die #4. The material extruded without melt fracture or discoloration at a melt flow of 5.3 gms./10 minutes. The copolyoxalamide is therefore injection moldable.

A 7.5 g. sample of the powdered copolyoxalamide was molded in a 2 inch diameter disc mold at 270° C. and 5000 psi to provide a clear amorphous molding. A Gehman plot of shear modulus vs. temperature on the molded polymer by the ASTM D 1053-58T procedure showed a TG=236° C.

A ¼" wide strip of the molded polymer was kept in boiling water for 7 days without showing any deterioration or loss of resiliency and therefore the polymer is adjudged hydrolytically stable.

A copolyoxalamide having the same recurring unit as above was prepared using the same ingredients but on a smaller scale and using a slightly different procedure. A 3.98 g. (0.01 mole) sample of the methylenedioxanilic ester, and 1.7 g. (0.01 mole) of the diamine were mixed in a 50 ml. side-arm equipped test tube with 20 ml. of o-dichlorobenzene. The mixture was heated for 2½ hours under nitrogen at 175° C. during which time ethanol distilled from the tube and the contents became viscous. The temperature was increased to 200° C. until the major portion of the o-dichlorobenzene had distilled and then the temperature was increased to 250° C. and was held there for ½ hour. The reaction mass had now set up to a foam. Vacuum was applied (0.1 mm. Hg.) and the temperature increased to 270° C. for 15 minutes to remove the last trace of o-dichlorobenzene. The cooled tube was broken and the copolyoxalamide was removed as a hard off-white solid foam.

A differential scanning calorimetric determination showed a polymer melt temperature of 265° C.

Thermogravimetric analysis in air showed no weight gain up to 375° C. (i.e. no oxidation). Weight loss started at 360° C. however at 375° C. it was only 0.1%. At 400° and 450° C. the weight loss was 8% and 51% respectively.

Using the apparatus and either procedure set forth above and the same reactants and amounts except that the 4,4'-methylenedioxanilic acid diethyl ester is replaced by an equimolar amount of the corresponding oxalate ester prepared from excess diethyloxalate and the corresponding diamines set forth in Table I (1a–1c) below, there are obtained the following copolyoxalamides (1a–1c) in accordance with the present invention which have recurring units corresponding to the following structure

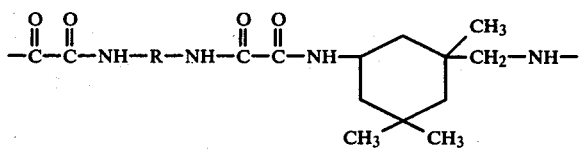

wherein the corresponding divalent radicals R are set forth in Table I.

TABLE I

| Diamine | —R— |
|---|---|
| 1(a) m-phenylenediamine |  |
| 1(b) 2,4-toluenediamine | 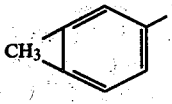 |
| 1(c) 4,4'-diaminodiphenyl-ether | 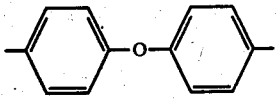 |

EXAMPLE 2

The resin flask equipped in accordance with Example 1 was charged with 15 g. (0.377 mole) of 4,4'-methylene-dioxanilic acid diethyl ester, 5.96 g. (0.0377 mole) of a 50/50 wt. percent mixture of 2,2,4- and 2,4,4-trimethylhexamethylenediamine (supplied by Thorson Chemical Corp., 299 Park Ave., New York, N. Y., 10017), and 64 ml. of o-dichlorobenzene.

The reaction mixture was heated at 150° C. under a gentle flow of nitrogen. Distillation of ethanol started quickly and it was collected overhead of the short path distillation column. After about 1½ hours ethanol distillation stopped and the reaction temperature was raised to 200° C. and held there for 2 hours causing the distillation of the o-dichlorobenzene. The mixture was then heated for 1 hour at 230° C. The mixture was cooled and yielded an off-while solid; ηinh at 30° C. (0.5% in m-cresol) =0.61.

The while solid was transferred to a 50 ml. test tube equipped with a side-arm and heated for 2 hours at 250° C. under a high vacuum (0.1 mm. of Hg.). This was followed by heating at 280° C. for 1 hour and 300° C. for 30 minutes. The light yellow copolyoxalamide had an ηinh at 30° C. (0.5% in m-cresol)=0.72 and had a recurring unit corresponding to the following structure

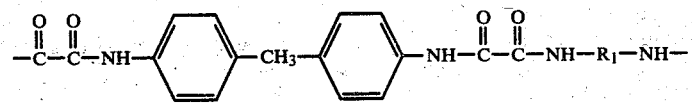

wherein $R_1$ in 50% of the recurring units is 2,2,4-trimethylhexylene and in the remaining 50% is 2,4,4-trimethylhexylene.

An 8.0 g. sample of the polymer was molded in a 2 inch diameter disc mold at 210° C. and 4000 psi to provide a translucent molding. A Gehman plot of shear modulus vs. temperature on the molded polymer showed a Tg=155° C. and the curve showed a continuing decrease in the shear modulus as the temperature was increased above the Tg which clearly demonstrated the injection moldability of the polymer. The polymer melted at 218° C. when measured by differential scanning calorimetry.

A sample of the moded copolyoxalamide was kept in boiling water for 7 days without showing any deterioration or loss of resiliency.

EXAMPLE 3

The polyoxalamide of this example is not in accordance with the present invention and was prepared for comparison purposes according to the following procedure.

The apparatus according to Example 1 was charged with 19.91 g. (0.05 mole) of 4,4'-methylenedioxanilic acid diethyl ester, 4.26 g. (0.025 mole) of 3-aminomethyl-3,5,5-trimethylcyclohexylamine, and 75 ml. of o-dichlorobenzene.

The solution was heated to 175° C. and held at that temperature for 3 hours during which time a clear solution resulted and ethanol distilled off. The solution was cooled to 70° C. and a solution of 2.91 g. (0.025 mole) of hexamethylenediamine dissolved in 25 ml. of o-dichlorobenzene was quickly added to the resin kettle followed by 25 ml. of rinse o-dichlorobenzene.

Heating of the solution was continued so that the temperature gradually rose up to 175° C. and was held there for 2 hours. Ethanol distilled off during this period.

The temperature was increased gradually to the 200°–225° C. range causing the o-dichlorobenzene to distill off and the reaction product to form as a crumbly solid. The solid was dried under vacuum at 200° C. for 2 hours. The solid polymer was pulverized and subjected to further solid state polymerization under 1 mm. Hg. for the following successive periods:4 hours at 225° C.; 2 hours at 260° C.; and 1 hour at 255° C.

The copolyoxalamide was characterized by a recurring unit corresponding to the following structure

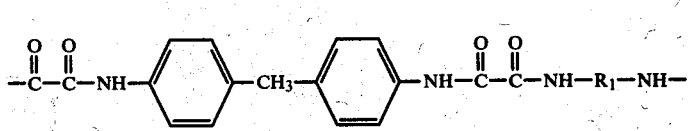

wherein $R_1$ in 50 percent of the recurring units is

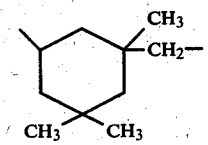

and in the remaining 50 percent is hexamethylene.

Differential scanning calorimetry showed two separate melting points at 265° C. and 320° C. and thermal gravimetric analysis showed no weight gain at 300° C.

A 7.5 g. sample was molded in a 2 inch diameter disc mold at 260° C. and 5000 psi. The molding was highly crystalline and somewhat brittle and therefore not suitable for injection molding.

EXAMPLE 4

In order to illustrate the marked difference in properties between the polymers of the invention and closely related polymers described in the prior art, the following copolyoxalamide, not in accordance with the present invention, was prepared, using the ingredients in accordance with the disclosure of U.S. Pat. No. 2,945,011.

The apparatus according to Example 1 was charged with a mixture of 11.94 g. (0.03 mole) of 4,4'-methylenedioxanilic acid diethyl ester, 3.48 g. (0.03 mole) of hexamethylenediamine, and 70 ml. of o-dichlorobenzene.

The mixture was heated to 150° C. under a gentle flow of nitrogen and distillation of a mixture of o-dichlorobenzene and ethanol started within the first 10 minutes of heating. After 2.5 hours the temperature was raised to 200° C. and the distillation of the dichlorobenzene without ethanol indicated the approaching completion of the reaction.

A white powder-like material was removed from the reaction flask and placed in a single neck round bottom flask. Vacuum was applied and the flask was heated to 100° C. to 150° C. effecting the removal of a small amount of residual o-dichlorobenzene. Heating was continued at 250° C. for 1.5 hours followed by 1 hour at 275° C. and 20 minutes at 300° C. Vacuum was maintained at 0.01 mm. Hg. throughout the heating periods.

The white copolyoxalamide was characterized by a recurring unit corresponding to the following structure

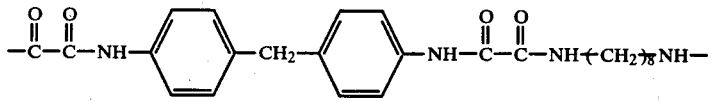

and it was further characterized by high temperature stability up to 300° C. when tested by thermal gravimetric analysis in a nitrogen atmosphere.

A sample of the white copolyoxalamide was molded at 290° C. under 4000 psi but complete fusion was not obtained. A second sample was molded at 310° C. under 4000 psi but also failed to fuse properly. A third attempt at 320° C. under the same pressure resulted in polymer discoloration and deterioration but still the fusion was incomplete.

We claim:

1. A thermoplastic copolyoxalamide consisting essentially of the recurring unit

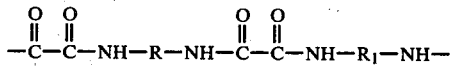

wherein R is a divalent radical selected from the group consisting of phenylene, tolylene, naphthylene, diphenylene, and divalent radicals having the formula

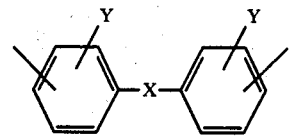

wherein Y is selected from the group consisting of hydrogen, alkyl having from 1 to 4 carbon atoms inclusive, alkoxy having from 1 to 4 carbon atoms inclusive, and halogen, and X is selected from the group consisting of —CO—, —SO$_2$—, —O—, —S—,

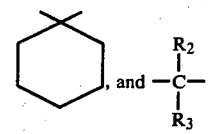

wherein $R_2$ and $R_3$ are independently selected from the class consisting of hydrogen and alkyl having from 1 to 4 carbon atoms inclusive, and mixtures thereof; and $R_1$ is a divalent radical selected from the group consisting of 2,2,4-trimethylhexylene, 2,4,4-trimethylhexylene,

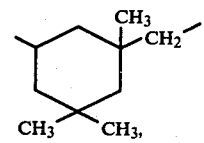

and mixtures thereof.

2. A thermoplastic copolyoxalamide consisting essentially of the recurring unit

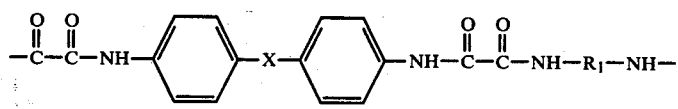

wherein X is selected from the group consisting of —CO—, —SO$_2$—, —O—, —S—,

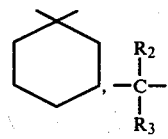

wherein $R_2$ and $R_3$ are independently selected from the class consisting of hydrogen and alkyl having from 1 to 4 carbon atoms inclusive, and mixtures thereof; and $R_1$ is a divalent radical selected from the group consisting of 2,2,4-tri-methylhexylene, 2,4,4-trimethylhexylene,

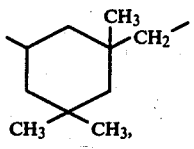

and mixtures thereof.

3. A copolyoxalamide according to claim 2 wherein X is methylene.

4. A copolyoxalamide according to claim 2 wherein $R_1$ is

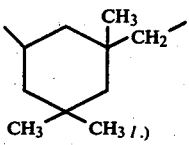

5. A copolyoxalamide according to claim 2 wherein $R_1$ in 50 percent of the recurring units is 2,2,4-trimethylhexylene and in the remaining 50 percent is 2,4,4-trimethylhexylene.

6. A thermoplastic copolyoxalamide consisting essentially of the recurring unit

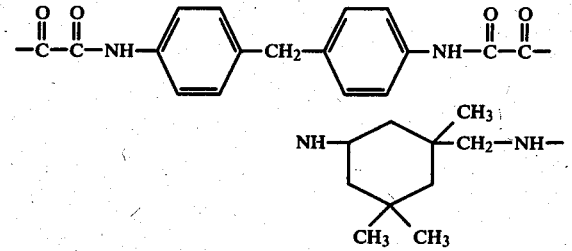

7. A thermoplastic copolyoxalamide consisting essentially of the recurring unit

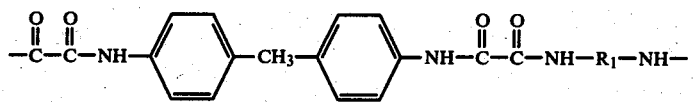

wherein $R_1$ in 50 percent of the recurring units is 2,2,4-trimethylhexylene and in the remaining 50 percent is 2,4,4-trimethylhexylene.

* * * * *

UNITED STATES PATENT OFFICE
CERTIFICATE OF CORRECTION

Patent No. 4,178,432          Dated December 11, 1979

Inventor(s) Augustin T. Chen and Kemal B. Onder

It is certified that error appears in the above-identified patent and that said Letters Patent are hereby corrected as shown below:

Column 2, lines 20-23:

Under formula, Roman numeral "I" is missing.

| | |
|---|---|
| Column 5, line 12: | Should read: |
| ofthe alcohol | of the alcohol |
| Column 5, lines 12 and 13: | Should read: |
| formula of (V). | formation of (V). |
| Column 5, line 30: | Should read: |
| 3,3+- | 3,3'- |
| Column 5, line 31: | Should read: |
| 3,3+- | 3,3'- |
| Column 5, line 32: | Should read: |
| 3,3+- | 3,3'- |

UNITED STATES PATENT OFFICE
CERTIFICATE OF CORRECTION

Patent No. 4,178,432        Dated December 11, 1979

Inventor(s) Augustin T. Chen and Kemal B. Onder

It is certified that error appears in the above-identified patent and that said Letters Patent are hereby corrected as shown below:

Column 6, line 50:                Should read:

aove                              above

Column 6, lines 62 and 63:        Should read:

in-
which                             in which

Column 9, lines 8-11:             Should read:

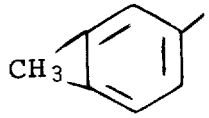              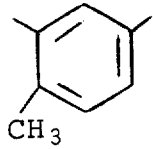

Column 9, lines 55-57:            Should read:

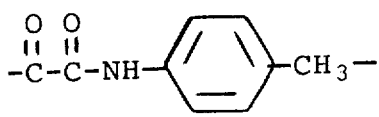              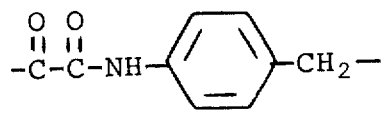

Column 10, line 3:                Should read:

moded                             molded

UNITED STATES PATENT OFFICE
CERTIFICATE OF CORRECTION

Patent No. 4,178,432  Dated December 11, 1979

Inventor(s) Augustin T. Chen and Kemal B. Onder

It is certified that error appears in the above-identified patent and that said Letters Patent are hereby corrected as shown below:

Column 10, lines 42-44:  Should read:

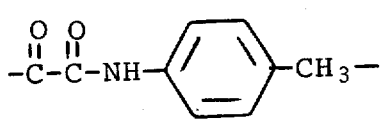   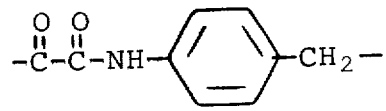

Column 12, claim 1, line 23:  Should read:

$R_I$   $R_1$

Column 13, Claim 4, lines 15-19:  Should read:

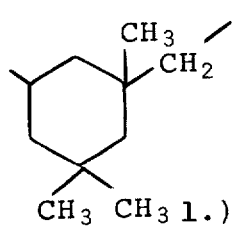   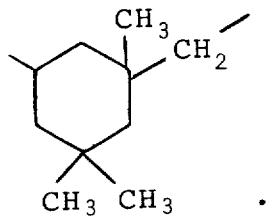

UNITED STATES PATENT OFFICE
CERTIFICATE OF CORRECTION

Patent No. 4,178,432  Dated December 11, 1979

Inventor(s) Augustin T. Chen and Kemal B. Onder

It is certified that error appears in the above-identified patent and that said Letters Patent are hereby corrected as shown below:

Column 14, claim 7, lines 20-24:  Should read:

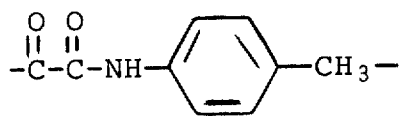 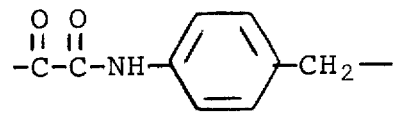

Signed and Sealed this

Sixth Day of May 1980

[SEAL]

Attest:

SIDNEY A. DIAMOND

Attesting Officer   Commissioner of Patents and Trademarks